United States Patent
Blum et al.

(10) Patent No.: US 9,690,375 B2
(45) Date of Patent: Jun. 27, 2017

(54) SYSTEMS AND METHODS FOR GENERATING AUGMENTED AND VIRTUAL REALITY IMAGES

(71) Applicant: Universal City Studios LLC, Universal City, CA (US)

(72) Inventors: Steven C. Blum, Orlando, FL (US); Brian B. McQuillian, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 283 days.

(21) Appl. No.: 14/462,249

(22) Filed: Aug. 18, 2014

(65) Prior Publication Data

US 2016/0048203 A1 Feb. 18, 2016

(51) Int. Cl.
| | | |
|---|---|---|
| G06F 3/00 | (2006.01) | |
| G06F 3/01 | (2006.01) | |
| G06T 19/00 | (2011.01) | |
| G02B 27/01 | (2006.01) | |
| A63G 21/00 | (2006.01) | |

(52) U.S. Cl.
CPC ............ *G06F 3/012* (2013.01); *A63G 21/00* (2013.01); *G02B 27/0101* (2013.01); *G06F 3/011* (2013.01); *G06T 19/006* (2013.01); *G02B 2027/0138* (2013.01); *G02B 2027/0141* (2013.01)

(58) Field of Classification Search
CPC ......... G06F 3/012; G06F 3/011; A63G 21/00; G02B 27/0101; G02B 2027/0138; G02B 2027/0141
See application file for complete search history.

(56) References Cited

U.S. PATENT DOCUMENTS

| | | | | |
|---|---|---|---|---|
| 2003/0062675 A1* | 4/2003 | Noro | .................... | A63F 3/00643 273/237 |
| 2007/0035561 A1* | 2/2007 | Bachelder | ............. | G06T 19/003 345/633 |
| 2007/0121957 A1* | 5/2007 | Trowbridge | ............. | A63G 7/00 381/61 |
| 2008/0030429 A1* | 2/2008 | Hailpern | ................. | A63F 13/10 345/8 |

(Continued)

OTHER PUBLICATIONS

PCT International Search Report and Written Opinion dated Oct. 5, 2015.

*Primary Examiner* — Jason C Smith
(74) *Attorney, Agent, or Firm* — Fletcher Yoder P.C.

(57) ABSTRACT

A ride system includes at least one ride vehicle. The at least one ride vehicle is configured to receive a ride passenger. The ride system includes electronic goggles configured to be worn by the ride passenger. The electronic goggles include a camera and a display. The ride system includes a computer graphics generation system communicatively coupled to the electronic goggles, and configured to generate streaming media of a real world environment based on image data captured via the camera of the electronic goggles, generate one or more virtual augmentations superimposed on the streaming media of the real world environment, and to transmit the streaming media of the real world environment along with the one or more superimposed virtual augmentations to be displayed on the display of the electronic goggles.

18 Claims, 5 Drawing Sheets

(56) References Cited

U.S. PATENT DOCUMENTS

| | | | |
|---|---|---|---|
| 2010/0182340 A1* | 7/2010 | Bachelder | G02B 27/017 345/633 |
| 2013/0050258 A1* | 2/2013 | Liu | G06F 17/3087 345/633 |
| 2013/0083003 A1* | 4/2013 | Perez | G06F 3/005 345/419 |
| 2013/0083008 A1* | 4/2013 | Geisner | G06T 19/006 345/419 |
| 2013/0130813 A1* | 5/2013 | Ackley | A63G 7/00 472/61 |
| 2014/0361988 A1* | 12/2014 | Katz | G06F 3/011 345/156 |
| 2016/0048203 A1* | 2/2016 | Blum | G06F 3/012 104/84 |

* cited by examiner

SYSTEMS AND METHODS FOR GENERATING AUGMENTED AND VIRTUAL REALITY IMAGES

BACKGROUND

The subject matter disclosed herein relates to amusement park attractions, and more specifically, to providing enhanced thrill factors and components of interest in amusement park attractions.

Amusement parks and/or theme parks may include various entertainment attractions, restaurants, and rides useful in providing enjoyment to patrons (e.g., families and/or people of all ages) of the amusement park. For example, the attractions may include traditional rides for kids such as carousels, as well as traditional rides for thrill seekers such as rollercoasters. It is now recognized that adding components of interest and thrill factors to such attractions can be difficult and limiting. Traditionally, for example, outside of providing an increasingly complex system of steep, twisting, and winding rollercoaster tracks, the thrill factor of such rollercoasters and/or other similar thrill rides may be limited to the existing course or physical nature of the thrill ride itself. It is now recognized that it is desirable to include components of interest and thrill factors in such attractions in a flexible and efficient manner relative to traditional techniques.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, a ride system includes at least one ride vehicle. The at least one ride vehicle is configured to receive a ride passenger. The ride system includes electronic goggles configured to be worn by the ride passenger. The electronic goggles include a camera and a display. The ride system includes a computer graphics generation system communicatively coupled to the electronic goggles, and configured to generate streaming media of a real world environment based on image data captured via the camera of the electronic goggles, generate one or more virtual augmentations superimposed on the streaming media of the real world environment, and to transmit the streaming media of the real world environment along with the one or more superimposed virtual augmentations to be displayed on the display of the electronic goggles.

In a second embodiment, a wearable electronic device includes goggles. The goggles include one or more displays disposed inside a frame front of the goggles, one or more cameras configured to capture an image of a real world environment associated with a ride of a theme park, and processing circuitry. The processing circuitry is configured to transmit the image of the real world environment to a computer graphics generation system, and to receive a signal from the computer graphics generation system. The signal includes a video stream of a virtualization of the real world environment along with at least one augmented reality (AR) image or at least one virtual reality (VR) image included in the video stream. The processing circuitry is also configured to cause the one or more displays to display the video stream.

In a third embodiment, a method includes receiving real-time data via a computer graphics generation system. Receiving the real-time data includes receiving a real-time video data stream from electronic goggles during a cycle of an amusement park ride. The method also includes generating a virtualization of a real world environment of the amusement park based on the received real-time video data stream, overlaying an augmented reality (AR) image or a virtual reality (VR) image onto the virtualization of the real world environment, and transmitting the overlaid AR image or the VR image along with the virtualization of the real world environment to the electronic goggles during the cycle of the amusement park ride.

In a fourth embodiment, a method includes receiving real-time image data via processing circuitry of electronic goggles. Receiving the real-time image data includes receiving a real-time video data stream captured via one or more cameras of the electronic goggles during a cycle of a theme park ride. The method also includes generating a virtualization of a real world environment of the theme park ride based on the captured real-time image data, overlaying an augmented reality (AR) image or a (VR) image onto the virtualization of the real world environment, and displaying the overlaid AR image or the VR image along with the virtualization of the real world environment via a display of the electronic goggles during the cycle of the theme park ride.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to systems and methods of providing an augmented reality (AR) experience, a virtual reality (VR) experience, a mixed reality (e.g., a combination of AR and VR) experience, or a combination thereof, as part of an attraction, such as a thrill ride, in an amusement park or theme park. In certain embodiments, each ride passenger may be provided a pair of electronic goggles or eyeglasses to be worn during a cycle of the thrill ride. The electronic goggles may facilitate an AR experience, a VR experience, or a combination of both experiences. Thus, the electronic goggles may be referred to as AR/VR goggles. Specifically, in one embodiment, the electronic goggles include at least two cameras, which may respectively correspond to the respective points of view (e.g., right and left eye views) of the ride passengers, and may be used to capture real-time video data (e.g., video captured during live use and transmitted in substantially real-time) of the real-world environment (e.g., aspects of the physical amusement park) of the ride passengers and/or the thrill ride. The electronic goggles may also include a display. For example, the electronic goggles may include at least two displays respectively corresponding to each eye of a ride passenger using the electronic goggles.

In certain embodiments, a computer graphics generation system may also be provided. The computer graphics generation system may receive the real-time video data (e.g., live video that is transmitted in substantially real-time) from the electronic goggles, and may render a video stream of the real-world environment along with various AR, VR, or combined AR and VR (AR/VR) graphical images to the respective displays of the respective electronic goggles of the ride passengers during a cycle of the ride. For example, in one embodiment, the computer graphics generation system may render the AR/VR graphical images to the electronic goggles based on, for example, the position or location of a ride passenger vehicle along the tracks of a rollercoaster during a cycle of a thrill ride, a predetermined distance traveled by the passenger ride vehicle during a cycle of the thrill ride, or after a predetermined lapse of time in the cycle of the thrill ride. In this way, by using the electronic goggles and the graphics generation system to create an AR experience, a VR experience, or mixed reality experience, the electronic goggles and the computer graphics generation system may enhance the thrill factor of the thrill ride, and, by extension, may enhance the experience of the ride passengers as they ride the thrill ride. However, it should be appreciated that the techniques described herein may not be limited to thrill rides and/or amusement park attraction applications, but may also be extended to any of various applications such as, for example, medical applications (e.g., image-guided surgery, noninvasive imaging analysis), engineering design applications (e.g., engineering model development), manufacturing, construction, and maintenance applications (e.g., products manufacturing, new building construction, automobile repairs), academic and/or vocational training applications, exercise applications (e.g., bodybuilding and weight loss models), television (TV) applications (e.g., weather and news), and the like.

Figure 1:
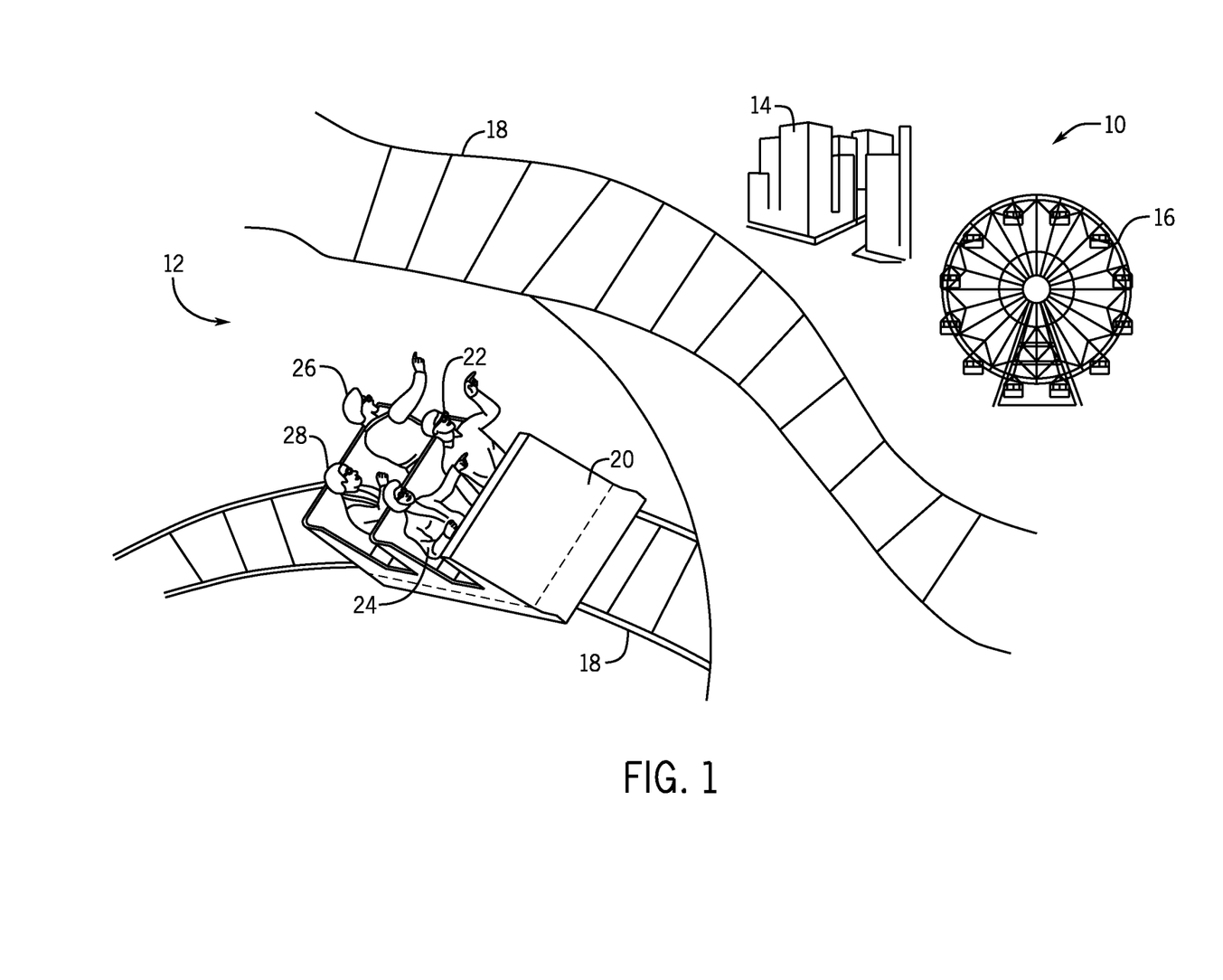
FIG. 1 illustrates an embodiment of an amusement park including one or more attractions in accordance with the present embodiments.

With the foregoing mind, it may be useful to describe an embodiment of an amusement park, such as an example amusement park 10 as depicted in FIG. 1. As illustrated, the amusement park 10 may include a thrill ride 12, a mall of amusement park facilities 14 (e.g., restaurants, souvenir shops, and so forth), and additional amusement attractions 16 (e.g., Ferris Wheel, dark ride, or other attraction). In certain embodiments, the thrill ride 12 may include a rollercoaster or other similar thrill ride, and may thus further include a closed-loop track or a system of closed-loop tracks 18 (e.g., miles of tracks 18). The tracks 18 may be provided as an infrastructure on which a passenger ride vehicle 20 may traverse, for example, as ride passengers 22, 24, 26, 28 ride the thrill ride 12. The tracks 18 may thus define the motion of the ride vehicle 20. However, in another embodiment, for example, the tracks 18 may be replaced by a controlled path, in which the movement of the ride vehicle 20 may be controlled via an electronic system, a magnetic system, or other similar system infrastructure other than the tracks 18. It should be appreciated that while the passenger ride vehicle 20 may be illustrated as a 4-passenger vehicle, in other embodiments, the passenger ride vehicle 20 may include any number of passenger spaces (e.g., 1, 2, 4, 8, 10, 20, or more spaces) to accommodate a single or multiple groups of ride passengers 22, 24, 26, 28.

As the passenger ride vehicle 20 traverses the tracks 18, the ride passengers 22, 24, 26, 28 may be provided a moving tour of the scenery (e.g., facilities 14, additional amusement attractions 16, and so forth) in an area around or nearby the thrill ride 12. For example, this may include the environment surrounding the thrill ride 12 (e.g., a building that fully or partially houses the thrill ride 12). While the ride passengers 22, 24, 26, 28 may find the thrill ride 12 to be a very enjoyable experience, in certain embodiments, it may be useful to enhance the experience of the ride passengers 22, 24, 26, 28 as the ride passengers 22, 24, 26, 28 ride the thrill ride 12 by enhancing, for example, the thrill factor of the thrill ride 12. Specifically, instead of having a physical view of only the facilities 14 (e.g., restaurants, souvenir shops, and so forth), additional amusement attractions 16 (e.g., Ferris Wheel or other attractions), or other patrons or pedestrians within the amusement park 10, it may be useful to provide the ride passengers 22, 24, 26, 28 with a augmented reality (AR) experience or a virtual reality (VR) experience as the ride vehicle 20 traverses the tracks 18.

Figure 2:
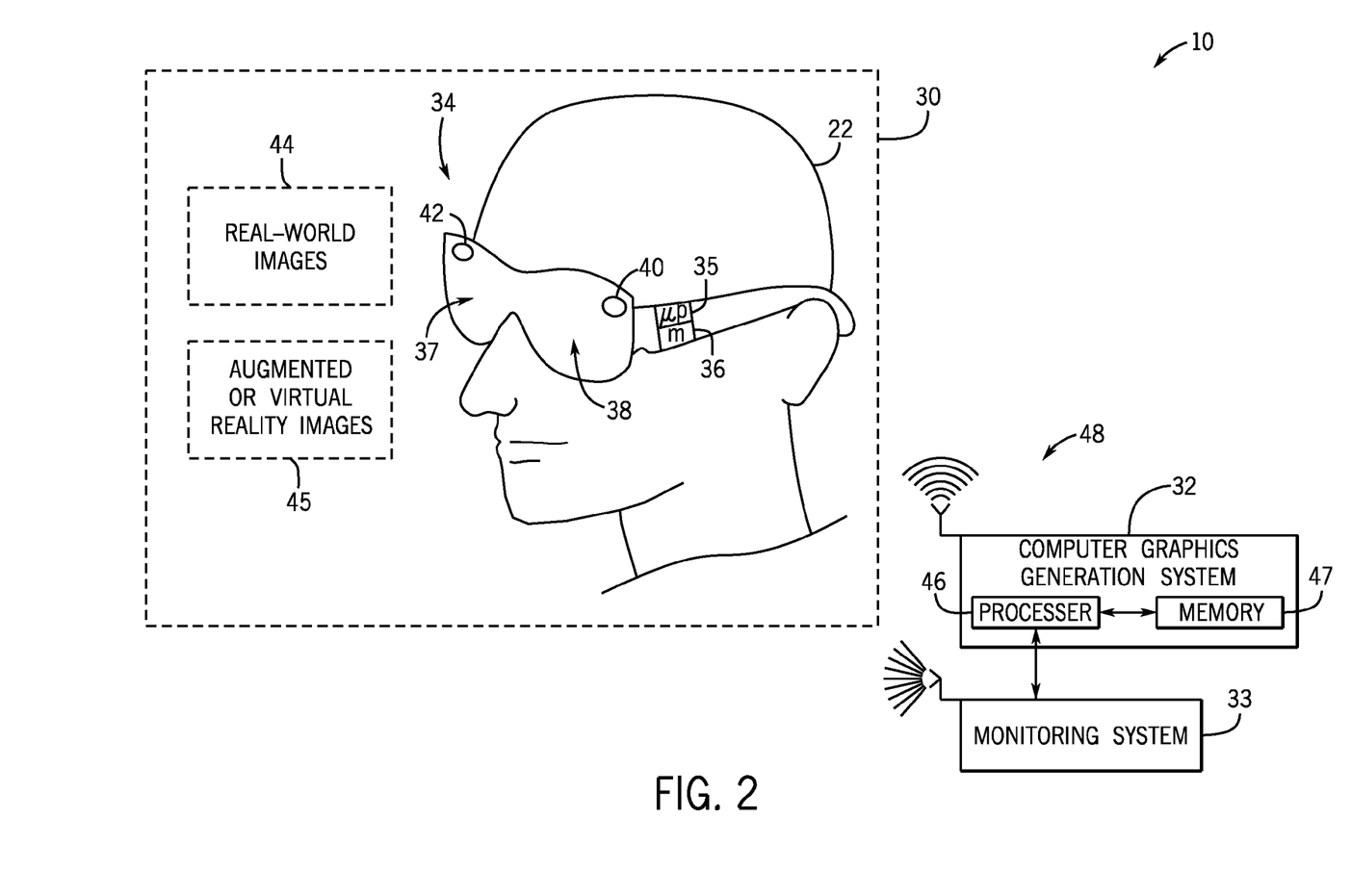
FIG. 2 is an illustration of an embodiment of augmented reality (AR) or virtual reality (VR) goggles and a computer graphics generation system in accordance with present embodiments.

For example, turning now to FIG. 2, each of the ride passengers 22, 24, 26, 28 may be provided a pair of electronic goggles 34, which may, in certain embodiments, include AV/VR eyeglasses. In other embodiments, the electronic goggles 34 may be included as part of a helmet, a visor, a headband, a pair of blinders, one or more eyepatches, and/or other headwear or eyewear that may be worn by the ride passengers 22, 24, 26, 28. As depicted, the electronic goggles 34 may be communicatively coupled to a computer graphics generation system 32 (e.g., within the amusement park 10) via a wireless network 48 (e.g., wireless local area networks [WLAN], wireless wide area networks [WWAN], near field communication [NFC]). The electronic goggles 34 may be used to create surreal environment 30, which may include an AR experience, a VR experience, a mixed reality (e.g., a combination of AR and VR) experience, a computer-mediated reality experience, a combination thereof, or other similar surreal environment for the ride passengers 22, 24, 26, 28 as the ride passengers 22, 24, 26, 28 ride the thrill ride 12. Specifically, the electronic goggles 34 may be worn by the ride passengers 22, 24, 26, 28 throughout the duration of the ride, such that ride passengers 22, 24, 26, 28 may feel completely encompassed by the environment 30 and may perceive the environment 30 to be a real-world physical environment. Specifically, as will be further appreciated, the environment 30 may be a real-time video including real-world images 44 that the ride passengers 22, 24, 26, 28 would see, even when not wearing the electronic goggles 34 electronically merged with one or more AR or VR images 45 (e.g., virtual augmentations). The term "real-time" indicates that the images are obtained and/or provided in a timeframe substantially close to the time of actual observation.

In certain embodiments, the electronic goggles 34 may be any of various wearable electronic devices that may be useful in creating an AR experience, a VR, and/or other computed-mediated experience to enhance the thrill factor of the thrill ride 12, and, by extension, the experience of the ride passengers 22, 24, 26, 28 while on the thrill ride 12. It should be appreciated that the eyeglasses embodiment of the electronic goggles 34 as discussed herein may be distinct from, and may provide many advantages over traditional devices such as head-mounted displays (HMDs) and/or heads-up displays (HUDs). For example, as will be further appreciated, the electronic goggles 34 may include a number of orientation and position sensors (e.g., accelerometers, magnetometers, gyroscopes, Global Positioning System [GPS] receivers) that may be used to track the position, orientation, and motion of the ride passengers 22, 24, 26, 28 during a cycle of the thrill ride 12.

Similarly, features of the electronic goggles 34 (e.g., geometric aspects or markings) may be monitored by a monitoring system (e.g., one or more cameras) to determine position, location, orientation, and so forth of the electronic goggles 34 and, in turn, that of the wearer. Still, the ride passengers 22, 24, 26, 28 may be monitored by a monitoring system 33 (e.g., a camera), which may be communicatively coupled to the computer graphics generation system 32 and used to identify position, location, orientation, and so forth of the ride passengers 22, 24, 26, 28. The ride vehicle 20 may also include one or more sensors (e.g., weight sensors, mass sensors, motion sensors, ultrasonic sensors) that may be useful in monitoring the respective ride passengers 22, 24, 26, 28 for the graphics generation system 32 to determine the point of view of the respective ride passengers 22, 24, 26, 28. Moreover, as will be further appreciated, because the electronic goggles 34 may include individual cameras (e.g., cameras 40 and 42) and individual displays (e.g., displays 37 and 38), data with respect to the respective points of view of each eye of the ride passengers 22, 24, 26, 28 may be captured by electronic goggles 34. All of these advantages may be unavailable using devices such as traditional HMDs and/or HUDs.

In certain embodiments, to support the creation of the environment 30, the electronic goggles 34 may include processing circuitry, such as a processor 35 and a memory 36. The processor 35 may be operatively coupled to the memory 36 to execute instructions for carrying out the presently disclosed techniques of generating real-world images 44 merged with one or more AR/VR images 45 to enhance the thrill factor of the thrill ride 12, and, by extension, the experience of the ride passengers 22, 24, 26, 28 while on the thrill ride 12. These instructions may be encoded in programs or code stored in a tangible non-transitory computer-readable medium, such as the memory 36 and/or other storage. The processor 35 may be a general-purpose processor, system-on-chip (SoC) device, an application-specific integrated circuit (ASIC), or some other similar processor configuration.

In certain embodiments, as further illustrated, the electronic goggles 34 may also include the pair of displays 37 and 38 (e.g., which may be provided in the frame front of the electronic goggles 34 where eyeglass lenses would otherwise appear) respectively corresponding to each eye of the ride passengers 22, 24, 26, 28. In other embodiments, a unified display may be employed. The respective displays 37 and 38 may each include an opaque liquid crystal display (LCD), an opaque organic light emitting diode (OLED) display, or other similar display useful in displaying the real-time images 44 and the AR/VR graphical images 45 to the ride passengers 22, 24, 26, 28. In another embodiment, the respective displays 37 and 38 may each include a see-through LCD or a see-through OLED display useful in allowing, for example, the ride passengers 22, 24, 26, 28 to view the real-world images 44 and the AR/VR graphical images 45 appearing on the respective displays 37 and 38 while preserving the ability to see through the respective displays 37 and 38 to the actual and physical real world environment (e.g., the amusement park 10).

The cameras 40 and 42 may respectively correspond to the respective points of view of the ride passengers 22, 24, 26, 28, and may be used to capture real-time video data (e.g., live video) of the real-world environment. In some embodiments, a single camera may be employed. Specifically, in the illustrated embodiment, the cameras 40, 42 of the goggles 34 may be used to capture real-time images of the real-world physical environment (e.g., the physical amusement park 10) perceived by the respective ride passengers 22, 24, 26, 28 from the point of view of the respective ride passengers 22, 24, 26, 28. As will be further appreciated, the electronic goggles 34 may then transmit (e.g. wirelessly via one or more communications interfaces included in the electronic goggles 34) real-time video data captured via the respective cameras 40 and 42 to a computer graphics generation system 32 for processing. However, in other embodiments, the real-time video data captured via the respective cameras 40 and 42 may be processed on the electronic goggles 34 via the processor 35. Additionally, the electronic goggles 34 may also transmit orientation data, position data, point of view data (e.g., focal length, orientation, pose, and so forth), motion tracking data, and so forth obtained and/or derived based on data obtained via orientation and position sensors (e.g., accelerometers, magnetometers, gyroscopes, Global Positioning System [GPS] receivers, and so forth) motion tracking sensors (e.g., electromagnetic and solid-state motion tracking sensors), and so forth, that may be included in the electronic goggles 34.

In certain embodiments, as previously noted, the computer graphics generation system 32, which may also includes processing circuitry, such as a processor 46 (e.g., general purpose processor or other processor) and a memory 47, may process the real-time video data (e.g., live video) and orientation and position data and/or point of view data received from the electronic goggles 34 or the monitoring system 33. Specifically, the computer graphics generation system 32 may use this data to generate a frame of reference to register the real-time video data with the generated real-world images 44 and the AR/VR graphical images 45. Specifically, using the frame of reference generated based on the orientation data, position data, point of view data, motion tracking data, and so forth, the graphics generation system 32 may then render a view of the real-world images 44 that is temporally and spatially commensurate with what the respective ride passengers 22, 24, 26, 28 would perceive if not wearing the electronic goggles 34. The graphics generation system 32 may constantly update (e.g., in real-time) the rendering of the real-world images to reflect change in respective orientation, position, and/or motion of the respective the ride passengers 22, 24, 26, 28.

For example, in certain embodiments, the graphics generation system 32 may render images (e.g., real world images 44 and AR/VR images 45) at a real-time rate greater than or equal to approximately 20 frames per second (FPS), greater than or equal to approximately 30 FPS, greater than or equal to approximately 40 FPS, greater than or equal to approximately 50 FPS, greater than or equal to approximately 60 FPS, greater than or equal to approximately 90 FPS, or greater than or equal to approximately 120 FPS. Furthermore, the graphics generation system 32 may generate the real-world images 44 for each of the respective electronic goggles 34 worn by the respective ride passengers 22, 24, 26, 28 (e.g., adjusted for the respective orientation, position, and point of view of the respective ride passengers 22, 24, 26, and 28).

In certain embodiments, as previously discussed, the computer graphics generation system 32 may also generate and render one or more AR/VR graphical images 45 superimposed on the real-world images 44 to create a complete AR experience, VR experience, mixed reality, and/or other computer-mediated experience for the ride passengers 22, 24, 26, 28. For example, in certain embodiments, the computer graphics generation system 32 may utilize one or more of the discussed video merging and/or optical merging techniques to superimpose the AR/VR graphical images 45 onto the real-world images 44, such that the ride passengers 22, 24, 26, 28 perceive the real-world physical environment of the amusement park 10 (e.g., provided as rendered video data via the respective displays 37 and 38) along with an AR/VR graphical image 45 (e.g., virtual augmentations) as the passenger ride vehicle 20 traverses the tracks 18. Specifically, as discussed above with respect to the rendering of the real-world images 44, the graphics generation system 32 may render a view of the AR/VR graphical images 45 that is temporally and spatially commensurate with the real-world images 44, such that the real-world images 44 may appear as a background overlaid with the AR/VR graphical images 45. Indeed, a model may provide computer generated images for any available viewpoint and specific images may be provided to the electronic goggles 34 for display based on a detected orientation of the electronic goggles 34.

In certain embodiments, the graphics generation system 32 may also generate one or more brightness, lighting, or shading models, and/or other photorealistic rendering models to generate the real-world images 44 and the AR/VR graphical images 45 adjusted to accurately reflect contrast and brightness of the real-world physical environment (e.g., sunny day, partly cloudy day, cloudy day, evening, night) in rendering the real-world images 44 and the AR/VR graphical images 45. For example, to increase the photorealism of the real-world images 44 and the AR/VR graphical images 45, the graphics generation system 32 may, in some embodiments, receive weather related data from one or more weather forecast and/or prediction systems (e.g., Global Forecast System, Doppler radars, and so forth). The graphics generation system 32 may then use the weather related data or other similar data to adjust the contrast, brightness, and/or other lighting effects of the real-world images 44 and/or the AR/VR graphical images 45.

In other embodiments, the graphics generation system 32 may adjust the contrast, brightness, and/or other lighting effects of the real-world images 44 and/or the AR/VR graphical images 45 based on lighting detected from one or more light sensors included in the electronic goggles 34 or based on the real-time video data captured by the cameras 40, 42. Furthermore, as previously noted, the graphics generation system 32 may constantly update (e.g., in real-time) the rendering of the AR/VR graphical images 45 to reflect change in respective orientations, positions, points of view, and/or motion of the respective ride passengers 22, 24, 26, 28. For example, as will be further appreciated with respect to FIG. 3, the graphics generation system 32 may render the AR/VR graphical images 45 on the respective displays 37 and 38 of each of the respective goggles 34 worn by the respective the ride passengers 22, 24, 26, 28 adjusted for the variable respective positions, points of view, and motions of the respective the ride passengers 22, 24, 26, and 28.

As will be further appreciated, the graphics generation system 32 may also generate the AR/VR graphical images 45 at a time in which the passenger ride vehicle 20 crosses at a predetermined point along the tracks 18. Thus, in certain embodiments, the graphics generation system 32 may use the received position data, point of view data, motion data along with GPS data or geographical informational systems (GIS) data to derive an illumination map of, for example, the thrill ride 12 and tracks 18, as well as the immediate environment surrounding the thrill ride 12 for the entire cycle of the thrill ride 12. The graphics generation system 32 may then use the map to introduce the AR/VR graphical images 45 at certain predetermined points (e.g., points based on location, distance, or time) as the passenger ride vehicle 24 traverses the tracks 18. Furthermore, in certain embodiments, the video or image data captured via the cameras 40, 42 may be used by the graphics generation system 32 to determine the points of location of the ride vehicle 20 and when to introduce the AR/VR graphical images 45. For example, the graphics generation system 32 may perform one or more geometric recognition algorithms (e.g., shape or object recognition) or photometric recognition algorithms (e.g., face recognition or specific object recognition) to determine the position or location of the ride vehicle 20 as well as the viewing position of the ride passengers 22, 24, 26, 28.

Figure 3:
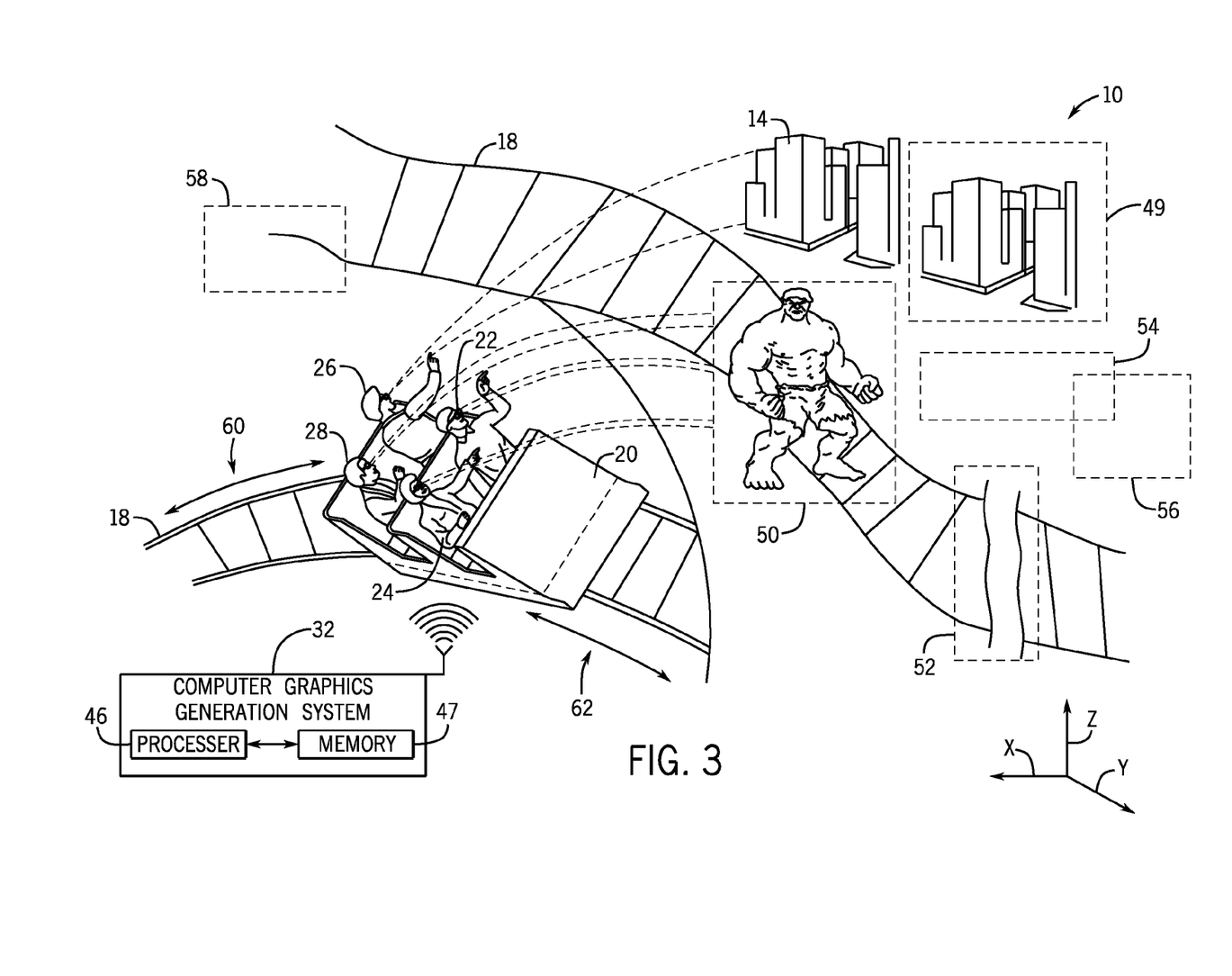
FIG. 3 is a perspective view of a thrill ride of FIG. 1 including various AR and VR images provided by way of the AR/VR goggles of FIG. 2, in accordance with present embodiments.

FIG. 3 illustrates various examples of AR/VR images 45 that may be generated by the graphics generation system 32, or in other embodiments, that may be generated via the goggles 34. Specifically, as illustrated in FIG. 3, during a cycle of the thrill ride 12, the graphics generation system 32 may render the real-world images 44, as well as various AR/VR graphical images 45 through the respective electronic goggles 34 (e.g., via the respective displays 37 and 38) of the rides passengers 22, 24, 26, 28. For example, as depicted, the real-world images 44 may include rendered images of, for example, the tracks 18, the facilities 14, and/or other patrons or objects that the ride passengers 22, 24, 26, 28 would see while riding the thrill 12, including the other passengers 22, 24, 26, 28, even if the electronic goggles 34 were not being worn by the ride passengers 22, 24, 26, 28. However, as previously discussed with respect to FIG. 2, in certain embodiments, it may be useful to enhance the thrill factor of the thrill ride 12 by rendering various AR/VR graphical images 45 to the respective displays 37 and 38 of the respective electronic goggles 34 of the ride passengers 22, 24, 26, and 28.

For example, as further depicted in FIG. 3, the graphics generation system 32 may render AR/VR graphical images 45 (illustrated via the dashed lines) that may include, for example, an AR/VR image of a second mall of amusement park facilities 49, an AR/VR image of one or more fictional characters 50, an AR/VR image of a breach 52 of the tracks 18, and/or additional AR/VR image 54, 56, and 58. In one embodiment, as illustrated in FIG. 3, the AR/VR image 50 may include an image of a monster or other similar fictional character appearing (e.g., from the point of view of the ride passengers 22, 24, 26, 28 while wearing the electronic goggles 34) to be obstructing a portion of the tracks 18 as the passenger ride vehicle 20 traverses the tracks 18. It should be appreciated that in addition to AR/VR graphical images 45 (e.g., virtual augmentations) that include an added image, the graphics generation system 32 may also render certain AR/VR graphical images 45 that include a deletion of one or more real-world physical objects that no longer appear while the ride passengers 22, 24, 26, 28 are wearing the electronic goggles 34. For example, the AR/VR image of the facilities 49 may appear at a place in which the attraction 16 is placed in the real-world environment.

As previously discussed, in certain embodiments, the graphics generation system 32 may render the AR/VR graphical images 45 based on, for example, the position or location of the passenger ride vehicle 20 along the tracks 18 at any given time during a cycle of the thrill ride 12, a predetermined distance traveled by the passenger ride vehicle 20 during a cycle of the thrill ride 12, or after a predetermined lapse of time. For example, in one embodiment, once the passenger ride vehicle travels to a point 60 (e.g., defined by a certain distance 62 or location on the tracks 18), the AR/VR image of the fictional character 50 may appear to the ride passengers 22, 24, 26, 28, via the electronic goggles 34, as obstructing a place on the tracks 18 not yet traversed by the passenger ride vehicle 20 during a given cycle of the thrill ride 12. Similarly, once the passenger ride vehicle 20 travels to a point 62 (e.g., defined by a certain distance 62 or location on the tracks 18), the AR/VR image of the breach 52 of the tracks 18 (e.g., appearance of a broken track) may appear to the ride passengers 22, 24, 26, 28, via the electronic goggles 34, as though the passenger ride vehicle 20 will encounter a place in which there is no supporting tracks 18.

Furthermore, in certain embodiments, the illumination map generated by the graphics generation system 32 may allow the graphics generation system 32 to include one or more detection and/or trigger points (e.g., trigger point for which to introduce the AR/VR images 45) at every mile of the tracks 18, every yard of the tracks 18, every foot of the tracks 18, every inch of the tracks 18, every centimeter of the tracks 18, or every millimeter of the tracks 18. In this way, the graphics generation system 32 may detect when to begin rendering of the AR/VR graphical images 45 based on position or location, distance traveled, and/or time elapsed during a cycle of the thrill ride 12 with sufficient accuracy and efficiency. Furthermore, the additional AR/VR images 54, 56 illustrate that one or more of the AR/VR graphical images 45 may appear to the ride passengers 22, 24, 26, 28 as interacting with each other (e.g., overlapping or touching). Similarly, the AR/VR image 58 illustrates an example of AR/VR graphical images 45 that may appear outside the line of sight or the point of view (e.g., blind spot) of the ride passengers 22, 24, 26, 28 that may be nevertheless perceived by the ride passengers 22, 24, 26, 28 should any of them look into the direction of the AR/VR image 58. It should be noted that completely different images may also be provided to different ride passengers 22, 24, 26, 28 such that one or more of the ride passengers 22, 24, 26, 28 have partially or completely different ride experiences or even ride themes.

In certain embodiments, as discussed above with respect to FIG. 2, because the graphics generation system 32 may render the real-world images 44 and the AR/VR images 45 to each of the respective displays 37 and 38 of the electronic goggles 34 worn by each of the respective the ride passengers 22, 24, 26, and 28, the ride passengers 22, 24, 26, 28 may each perceive the real-world images 44 (e.g., facilities 14, thrill ride 12, and so forth) and the AR/VR images 45 (e.g., AR/VR images or virtual augmentations 49, 50, 52, 54, 56, and 58) temporally and spatially commensurate with their respective points of view, thus creating a photorealistic effect as the passenger ride vehicle 20 traverses the tracks 18. Furthermore, in other embodiments, in addition to the AR/VR images 45 (e.g., AR/VR images or virtual augmentations 49, 50, 52, 54, 56, and 58), the graphics generation system 32 may also trigger one or more sound effects, haptic feedback effects, scented effects, and so forth that may coincide with the appearances of the AR/VR images 45 on the electronic goggles 34. In some embodiments, the graphics generation system 32 is integral with the electronic goggles 34.

In this way, by providing the electronic goggles 34 and the graphics generation system 32 to create an AR experience, a VR experience, and/or other computed-mediated reality experience, the electronic goggles 34 and the graphics generation system 32 may enhance the thrill factor of the thrill ride 12, and, by extension, the experience of the ride passengers 22, 24, 26, 28 while on the thrill ride 12. Moreover, by providing the electronic goggles 34 as AR/VR eyeglasses, as opposed to bulkier and more cumbersome devices such as traditional head-mounted displays (HMDs), the ride passengers 22, 24, 26, 28 may be provided with greater freedom of movement, as well as a more photorealistic experience. For example, each of the ride passengers 22, 24, 26, 28 may be able to see each other ride passenger 22, 24, 26, 28, as well as the passenger ride vehicle 20 itself even when wearing the electronic goggles 34. Moreover, because the electronic goggles 34 may include individual cameras 40, 42 and individual displays 37, 38, data with respect to the respective points of view of each eye of the ride passengers 22, 24, 26, 28 may be captured by the electronic goggles 34. Thus, the graphics generation system 32 may render real-world images 44 and AR/VR images 45 on the displays 37, 38 of the electronic goggles 34 that are consistent with the respective points of view of the ride passengers 22, 24, 26, 28. Such advantages may be unavailable using devices such as traditional HMDs.

Figure 4:
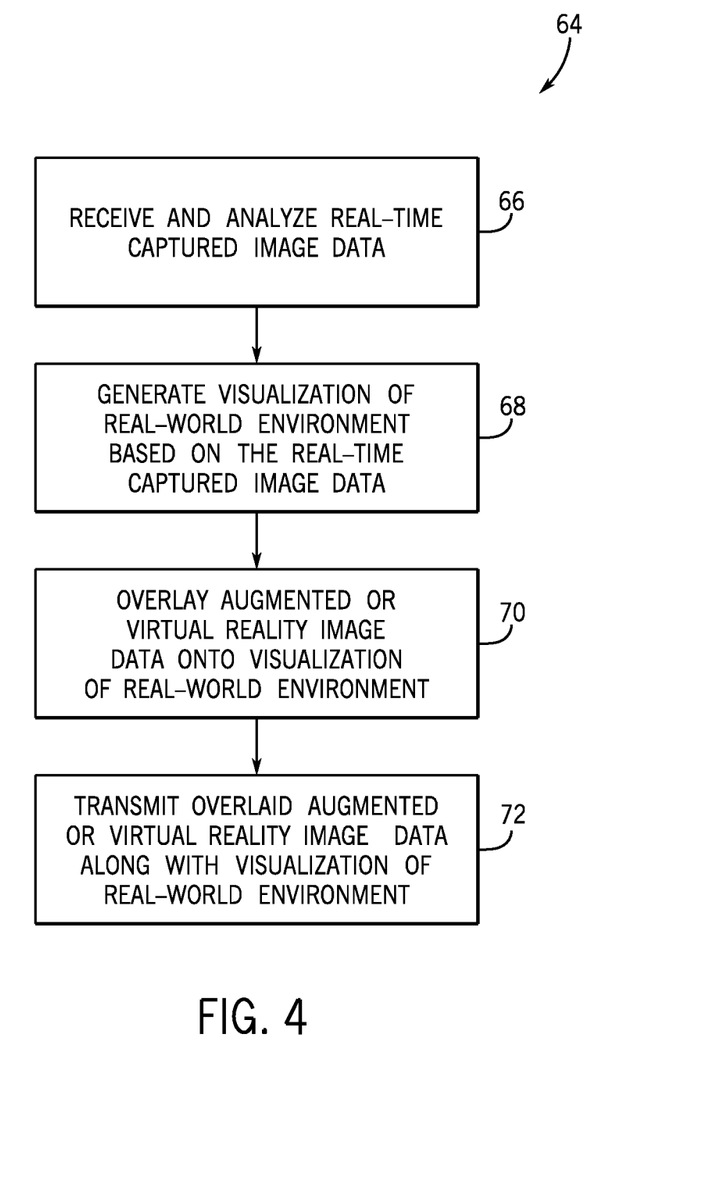
FIG. 4 is a flowchart illustrating an embodiment of a process useful in creating an AR experience, a VR experience, or a mixed reality experience during a ride by using the computer graphics generation system of FIG. 2, in accordance with present embodiments.

Turning now to FIG. 4, a flow diagram is presented, illustrating an embodiment of a process 64 useful in creating an AR experience, a VR experience, and/or other computed-mediated experience during a thrill ride using, for example, the computer graphics generation system 32 depicted in FIG. 2. The process 64 may be representative of initiated code or instructions stored in a non-transitory computer-readable medium (e.g., the memory 47) and executed, for example, by the processor 46 included in the computer graphics generation system 32. The process 64 may begin with the processor 46 receiving (block 66) and analyzing real-time captured image data. For example, the processor 46 may receive real-time video data (e.g., live video) captured via cameras 40, 42 of the electronic goggles 34. The process 64 may then continue with the processor 46 generating (block 68) a visualization of the real-world environment based on the real-time captured image data. For example, the processor 46 may generate a video data stream of the real-world environment (e.g., the amusement park 10) to be displayed on the displays 37, 38 of the electronic goggles 34.

The process 64 may then continue with the processor 46 overlaying (block 70) or superimposing one or more augmented or virtual reality images onto the generated visualization of the real-world environment. For example, the processor 46 may generate a video data stream of the real-world images 44 (e.g., facilities 14, thrill ride 12), and overlay or superimpose the AR/VR images 45 (e.g., AR/VR images or virtual augmentations 49, 50, 52, 54, 56, and 58) onto the real-world images 44 using one or more video merging and/or optical merging techniques. As previously discussed above, in certain embodiments, for example, the processor 46 of the graphics generation system 32 may render the AR/VR graphical images 45 based on, for example, the position or location of the passenger ride vehicle 20 along the tracks 18 at any given time during a cycle of the thrill ride 12, a predetermined distance traveled by the passenger ride vehicle 20 during a cycle of the thrill ride 12, or after a predetermined lapse of time. In other embodiments, the graphics generation system 32 may perform one or more geometric or photometric recognition algorithms on the video or image data captured via the cameras 40, 42 to determine the points of location of the ride vehicle 20 and when to introduce the AR/VR graphical images 45. The process 64 may then conclude with the processor 46 transmitting (block 72) the overlaid augmented or virtual reality image data (e.g., AR/VR images 45) along with the real-world environment data (e.g., real-world images 44) to be displayed on the displays 37, 38 of the electronic goggles 34 to enhance the thrill factor of the thrill ride 12, and, by extension, the experience of the ride passengers 22, 24, 26, 28 while on the thrill ride 12.

Figure 5:
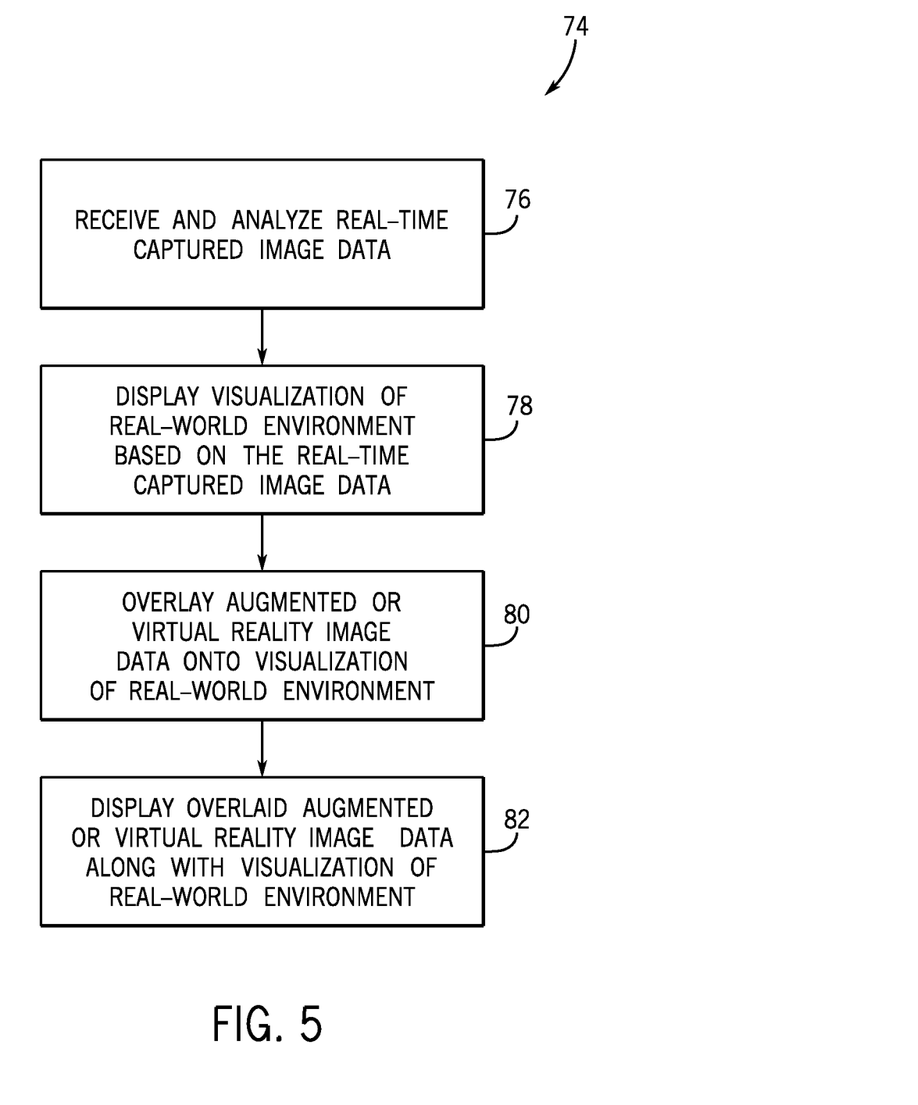
FIG. 5 is a flowchart illustrating an embodiment of a process useful in creating an AR experience, a VR experience, or a mixed reality experience during a ride by using the AR/VR goggles of FIG. 2, in accordance with present embodiments.

Similarly, FIG. 5 presents a flow diagram of an embodiment of a process 74 useful in creating an AR experience, a VR experience, and/or other computed-mediated experience during a thrill ride using, for example, the electronic goggles 34 depicted in FIG. 2. The process 74 may include code or instructions stored in a non-transitory computer-readable medium (e.g., the memory 36) and executed, for example, by the processor 35 included in the electronic goggles 34. The process 74 may begin with the processor 35 receiving (block 76) and analyzing real-time captured image data. For example, the processor 35 may receive real-time video data (e.g., live video) captured via cameras 40, 42 of the electronic goggles 34. The process 74 may then continue with the processor 35 generating (block 78) a visualization of the real-world environment based on the real-time captured image data. For example, as the processor 35 may generate a video data stream of the real-world environment (e.g., the amusement park 10) to be displayed on the displays 37 and 38 of the AR/VR goggles 34.

The process 74 may then continue with the processor 35 overlaying (block 80) or superimposing one or more augmented or virtual reality images onto the generated visualization of the real-world environment. For example, the processor 35 may generate a video data stream of the real-world images 44 (e.g., facilities 14, thrill ride 12, and so forth), and overlay or superimpose the AR/VR images 45 (e.g., AR/VR images or virtual augmentations 49, 50, 52, 54, 56, and 58) onto the real-world images 44 using one or more video merging and/or optical merging techniques. For example, the processor 35 of the electronic goggles 34 may render the AR/VR images 45 (e.g., AR/VR images or virtual augmentations 49, 50, 52, 54, 56, and 58) based on, for example, the position and orientation of the ride passengers 22, 24, 26, 28, the position and location of the passenger ride vehicle 20, predetermined lapse of time, geometric or photometric recognition of certain features in the video and image data captured by the cameras 40, 42, or based one or more user-selectable settings applied, for example, by the ride passengers 22, 24, 26, 28 prior to or during a cycle of the thrill ride 12. The process 74 may then conclude with the processor 35 causing the respective displays 37 and 38 to display (block 82) the overlaid augmented or virtual reality image data (e.g., AR/VR images 45) along with the real-world environment data (e.g., real-world images 44) to be displayed on the displays 37 and 38 of the electronic goggles 34 to enhance the thrill factor of the thrill ride 12 and to enhance the experience of the ride passengers 22, 24, 26, 28.

Technical effects of the present embodiments relate to systems and methods of providing an augmented reality (AR) experience, a virtual reality (VR) experience, a mixed reality (e.g., a combination of AR and VR) experience, or a combination thereof, as part of a thrill ride in an amusement park or theme park. In certain embodiments, each ride passenger may be provided a pair of electronic goggles (e.g., AR/VR eyeglasses) to be worn during a cycle of the thrill ride. Specifically, the electronic goggles may include at least two cameras, which may respectively correspond to the respective points of view of the ride passengers, and may be used to capture real-time video data (e.g., live video) of the real-world environment (e.g., the physical amusement park) of the ride passengers and/or the thrill ride. The electronic goggles may also include at least two displays respectively corresponding to each eye of the ride passengers. In certain embodiments, a computer graphics generation system may also be provided. The computer graphics generation system may render a video stream of the real-world environment along with various AR/VR graphical images to the respective displays of the respective electronic goggles of the ride passengers during a cycle of the thrill ride. For example, in one embodiment, the graphics generation system 32 may render the AR/VR graphical images to the electronic goggles based on, for example, the position or location of the passenger ride vehicle along the tracks at any given time during a cycle of the thrill ride, a predetermined distance traveled by the passenger ride vehicle during a cycle of the thrill ride, or after a predetermined lapse of time. In this way, by using the electronic goggles and the graphics generation system to create an AR experience, a VR experience, and/or mixed reality experience, the electronic goggles and the computer graphics generation system may enhance the thrill factor of the thrill ride, and, by extension, may enhance the experience of the ride passengers as they ride the thrill ride.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:
1. A ride system, comprising:
   a ride vehicle configured to receive a ride passenger and comprising a position sensor;
   electronic goggles configured to be worn by the ride passenger, wherein the electronic goggles comprise a camera and a display; and a computer graphics generation system communicatively coupled to the electronic goggles and to the position sensor of the ride vehicle, and configured to:
  determine a point of view of the ride passenger using data at least from the position sensor of the ride vehicle;
  generate streaming media of a real world environment based at least on image data captured via the camera of the electronic goggles and the point of view of the ride passenger;
  generate one or more virtual augmentations superimposed on the streaming media of the real world environment; and
  transmit the streaming media of the real world environment along with the one or more superimposed virtual augmentations to be displayed on the display of the electronic goggles.

2. The ride system of claim 1, wherein the display of the electronic goggles comprises a first display and a second display, and wherein the first display is configured to display the streaming media to a first eye of the ride passenger and the second display is configured to display the streaming media to a second eye of the ride passenger.

3. The ride system of claim 2, wherein each of the first display and the second display comprises an opaque liquid crystal display (LCD) or an opaque organic light emitting diode (OLED) display.

4. The ride system of claim 1, wherein the electronic goggles comprise an additional camera, and wherein the camera is configured to capture a first viewpoint corresponding to a first eye of the ride passenger and the additional camera is configured to capture a second viewpoint corresponding to a second eye of the ride passenger.

5. The ride system of claim 1, wherein the computer graphics generation system is configured to generate the one or more virtual augmentations when the at least one ride vehicle travels to a predetermined location, travels a predetermined distance, after a predetermined lapse of time, or any combination thereof, during a ride cycle.

6. The ride system of claim 5, comprising a rollercoaster including a track, and wherein the computer graphics generation system is configured to generate the one or more virtual augmentations when the at least one ride vehicle travels to the predetermined location along the track, travels the predetermined distance along the track, after the predetermined lapse of time, or any combination thereof.

7. The ride system of claim 1, wherein the computer graphics generation system is configured to generate the streaming media of the real world environment based on an orientation of the electronic goggles, a position of the ride passenger, and the point of view of the ride passenger.

8. The ride system of claim 7, comprising a positioning sensor within the electronic goggles configured to detect the orientation of the electronic goggles.

9. The ride system of claim 7, comprising a monitoring system configured to monitor physical attributes of the electronic goggles to determine the orientation of the electronic goggles.

10. The ride system of claim 7, comprising a sensor configured to detect the position of the ride passenger within the at least one ride vehicle.

11. The ride system of claim 1, wherein the computer graphics generation system is configured to render the streaming media of the real world environment and the one or more superimposed virtual augmentations to the display at a rate greater than or equal to approximately 30 frames per second (FPS).

12. The ride system of claim 1, wherein the computer graphics generation system is configured to:
  receive an indication of a lighting, a contrast, a brightness, or a combination thereof, associated with the real world environment; and
  generate the streaming media of the real world environment and the one or more superimposed virtual augmentations adjusted to reflect the lighting, the contrast, the brightness, or the combination thereof, of the real world environment.

13. The ride system of claim 1, wherein the display comprises a first display and a second display and wherein the computer graphics generation system is configured to:
  receive an indication of a first viewpoint and a second viewpoint of the ride passenger respectively captured via the camera and an additional camera of the electronic goggles;
  generate the streaming media of the real world environment and the one or more superimposed virtual augmentations based at least in part on the first viewpoint and the second viewpoint; and
  render the streaming media respectively on each of the first display and the second display, wherein the streaming media rendered on the first display corresponds to the first viewpoint and the streaming media rendered on the second display corresponds to the second viewpoint.

14. A method, comprising:
  receiving real-time data via a computer graphics generation system, wherein receiving the real-time data comprises receiving a real-time video data stream from electronic goggles during a cycle of an amusement park ride and data from a position sensor of a ride vehicle of the amusement park ride;
  determining a point of view of a ride passenger based at least on the data from the position sensor;
  generating a virtualization of a real world environment of an amusement park based at least on the received real-time video data stream and the point of view of the ride passenger;
  overlaying an augmented reality (AR) image or a virtual reality (VR) image onto the virtualization of the real world environment; and
  transmitting the overlaid AR image or the overlaid VR image along with the virtualization of the real world environment to the electronic goggles during the cycle of the amusement park ride.

15. The method of claim 14, wherein receiving the real-time data comprises receiving data associated with a position of the ride passenger of the amusement park ride, an orientation of the ride passenger, or a combination thereof.

16. The method of claim 14, comprising transmitting the overlaid AR image or the overlaid VR image along with the virtualization of the real world environment based at least in part on a position of the ride passenger of the amusement park ride, an orientation of the ride passenger, the point of view of the ride passenger, a location of the ride vehicle of the amusement park ride, an orientation of the electronic goggles, a predetermined period of time, a recognition of one or more features in the real-time video data stream, or any combination thereof.

17. A method, comprising:
  receiving real-time image data via processing circuitry of electronic goggles, wherein receiving the real-time image data comprises receiving a real-time video data stream captured via one or more cameras of the electronic goggles during a cycle of a theme park ride;

determining a point of view of a ride passenger based on data from a position sensor positioned on a ride vehicle in which the ride passenger is situated;

generating a virtualization of a real world environment of the theme park ride based on the received real-time image data and the determined point of view;

overlaying an augmented reality (AR) image or a virtual reality (VR) image onto the virtualization of the real world environment; and displaying the overlaid AR image or the overlaid VR image along with the virtualization of the real world environment via a display of the electronic goggles during the cycle of the theme park ride.

18. The method of claim 17, comprising displaying the overlaid AR image or the overlaid VR image along with the virtualization of the real world environment based at least in part on a position of the electronic goggles, an orientation of the electronic goggles, the determined point of view of the ride passenger of the theme park ride, a location of the ride vehicle of the theme park ride, a predetermined period of time, a recognition of one or more features in the real-time video data stream, a user-configurable setting, or any combination thereof.

* * * * *